US006842412B2

(12) United States Patent
Ushiyama et al.

(10) Patent No.: US 6,842,412 B2
(45) Date of Patent: Jan. 11, 2005

(54) INFORMATION RECORDING METHOD AND OPTICAL DISC APPARATUS

(75) Inventors: Junko Ushiyama, Kokubunji (JP); Hiroyuki Minemura, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 552 days.

(21) Appl. No.: 09/930,269

(22) Filed: Aug. 16, 2001

(65) Prior Publication Data

US 2002/0176338 A1 Nov. 28, 2002

(30) Foreign Application Priority Data

May 22, 2001 (JP) ........................................ 2001-152245

(51) Int. Cl.$^7$ ................................................. G11B 5/09
(52) U.S. Cl. ................................. 369/47.53; 369/53.27
(58) Field of Search ............................ 369/47.38, 47.39, 369/47.4, 47.5, 47.51, 47.53, 47.55, 53.26, 53.27, 53.3, 53.37, 116

(56) References Cited

U.S. PATENT DOCUMENTS

| 5,309,419 A | * | 5/1994 | Koike ......................... 369/116 |
| 6,031,803 A | * | 2/2000 | Kubota et al. ............... 369/116 |
| 6,111,841 A | * | 8/2000 | Iida et al. .................... 369/116 |
| 6,438,078 B2 | * | 8/2002 | Yamazaki et al. ......... 369/44.29 |
| 6,529,457 B1 | * | 3/2003 | Narumi et al. ............ 369/47.53 |

FOREIGN PATENT DOCUMENTS

| JP | 6-012785 | 1/1994 |
| JP | 6-089506 | 3/1994 |
| JP | 8-212691 | 8/1996 |
| JP | 10-106008 | 4/1998 |
| JP | 10-106025 | 4/1998 |
| JP | 11-296858 | 10/1999 |

OTHER PUBLICATIONS

"High Density Mark Edge Recording on a Phase Change Rewritable Disk by a 680nm Laser Diode" by Ishida, et al. pp. 70–75.

* cited by examiner

Primary Examiner—Paul W. Huber
(74) Attorney, Agent, or Firm—Antonelli, Terry, Stout & Kraus, LLP

(57) ABSTRACT

Good jitter is retained and recorded even when a linear velocity is variable. A recording parameter suitable for each of the linear velocities is obtained by performing test writings for an outer periphery zone of a disc at different linear velocities, and based on a correlation between each of the linear velocities and a recording parameter suitable for each of the linear velocities, a recording parameter corresponding to a linear velocity on an area onto which information is to be recorded is obtained.

5 Claims, 7 Drawing Sheets

FIG. 11

| TERMS | WRITE TEST AREA | V(m/s) | WRITE POWER | ERASE POWER | PULSE WIDTH | | | POWER LEVEL | | |
|---|---|---|---|---|---|---|---|---|---|---|
| | | | | | FP | (MP) | LP | FIRST PULSE | MULTI PULSE | LAST PULSE |
| A | WRITE TEST ZONE IN AN INNER PERIPHERY | a | Pw(A) | Pe(A) | FP(A) | (MP(A)) | LP(A) | P$_{FP}$(A) | P$_{MP}$(A) | P$_{LP}$(A) |
| B | WRITE TEST ZONE IN AN OUTER PERIPHERY | a | Pw(B) | Pe(B) | FP(B) | (MP(B)) | LP(B) | P$_{FP}$(B) | P$_{MP}$(B) | P$_{LP}$(B) |
| C | WRITE TEST ZONE IN AN OUTER PERIPHERY | a×1.5 | Pw(C) | Pe(C) | FP(C) | (MP(C)) | LP(C) | P$_{FP}$(C) | P$_{MP}$(C) | P$_{LP}$(C) |
| D | WRITE TEST ZONE IN AN OUTER PERIPHERY | a×2 | Pw(D) | Pe(D) | FP(D) | (MP(D)) | LP(D) | P$_{FP}$(D) | P$_{MP}$(D) | P$_{LP}$(D) |
| E | WRITE TEST ZONE IN AN OUTER PERIPHERY | a×2.5 | Pw(E) | Pe(E) | FP(E) | (MP(E)) | LP(E) | P$_{FP}$(E) | P$_{MP}$(E) | P$_{LP}$(E) |

INFORMATION RECORDING METHOD AND OPTICAL DISC APPARATUS

BACKGROUND OF THE INVENTION

1. Field of the Invention

The present invention relates to an information recording method and an optical disc apparatus which record information onto an optical disc by use of light.

2. Descriptions of the Related Arts

An optical disc formatted in accordance with a ZCLV (Zoned Constant Linear Velocity) scheme is divided into a plurality of zones in its radius direction, and recording/reproducing of information in each zone is performed by a CAV (Constant Angular Velocity) scheme. A frequency of a recording/reproducing signal is constant, and the ZCLV scheme has a feature in that information can be recorded densely even in an external periphery of a disc like in an inner periphery thereof In a DVD-RAM disc, this ZCLV scheme is adopted, and a high density recording of 2.6 GB is achieved in a first generation, and a high density recording of 4.7 GB is achieved in a second generation. In this CAV scheme, since a linear velocity is made to be constant in both of the inner and outer peripheries of the disc, a rotation number of the disc is made to be high when an optical head is above the inner periphery of the disc, and on the contrary the rotation number of the disc is made to be low when the optical head is above the outer periphery of the disc. Accordingly, a seek operation is performed for the disc, not only movement of the optical head but also the rotation number of the disc must be controlled. For example, in the case of an optical disc having a diameter of 120 mm, the rotation number of the disc becomes half when the seek operation is performed from 25 mm radius to 50 mm radius on the disc, and much time is taken for a control of a spindle motor. Accordingly, time for controlling a rotation number of the spindle motor sometimes determines seek time. Furthermore, a problem that power consumption increases because of the control of the rotation number of the spindle motor also occurs. In Japanese Patent Laid-Open No. 11 (1999)-296858, disclosed is a method to adjust write power in accordance with actual linear velocity is disclosed even when an actual rotation number cannot fully follow a targeted rotation number immediately after a seek operation and the like, hence a linear velocity differs from a targeted velocity.

If the rotation number is made to be approximately equal over the inner and outer peripheries of the disc, the time for controlling the rotation number in performing the seek operation can be shortened, and the power consumption necessary for controlling the rotation number of the spindle motor can be reduced. Accordingly, disclosed is a method in which, to realize a high transfer rate in a reproduction of information, even when a rotation number is constant or changes a little, the reproduction of the information recorded on a disc formatted in accordance with a CLV scheme is performed by making a clock frequency low in an inner periphery where a linear velocity is low and the clock frequency high in an outer periphery where the linear velocity is high (Japanese Patent Laid-Open Nos. 6 (1994)-89506, 6 (1994)-12785 and the like). In recording information, as in Japanese Patent Laid-Open No. 8 (1996)-212691, disclosed is a method in which a rotation number of the disc is made to be constant, and a clock frequency of a recording signal is made to be changed depending on a linear velocity, thus enabling a high speed recording. In this recording method, since the linear velocity changes depending on a radius of the disc, recording conditions must be optimized in accordance with the linear velocity. According to Japanese Patent Laid-Open Nos. 8 (1996)-212691 and 10 (1998)-106025 and the like, recording conditions are optimized by changing properties of a recording medium depending on whether recording is performed for an inner periphery of the recording medium or for an outer periphery thereof. However, this recording medium is used exclusively for an optical disc of which rotation number is controlled to be constant or approximately constant, therefore uses of this recording medium are limited. As means for solving these problems, in Japanese Patent Laid-Open No. 10 (1998)-106008, disclosed is a method in which recording conditions are not optimized depending on the recording medium, but a recording mark having the most preferable shape is formed by changing power and a pulse width in recording information thereonto depending on a linear velocity.

Also in the ZCLV scheme in which a linear velocity is approximately constant, to achieve a high density recording, a scheme for changing a recording pulse width in forming a recording mark is adopted. As is written in p. 70 of Sixth Phase Change Recording Conference Abstracts, 1994, this ZCLV scheme is the one in which a recording pulse shape is varied with a length shorter than a clock unit depending on a precedent space and/or a subsequent space, (an adaptive type recording waveform control). This scheme can suppress an edge shift as little as possible, which originates from thermal interference along a track direction caused by a fact that a recording mark and a space are smaller than a light spot, and it is very effective for a mark edge recording. In the adaptive type recording waveform control, test writing is performed before information is recorded onto a data section, so that the optimized recording waveform and the optimized write power can be obtained in accordance with individual discs and operation circumstances. For example, in the case of a 4.7 GB DVD-RAM medium, a write test zone is provided in each of an inner periphery area and an outer periphery area (see FIG. 2), and the test writing is executed by use of these zones when necessary. When the linear velocity is approximately constant, the test writing has been executed at one linear velocity by use of the inner periphery area or/and the outer periphery area.

In general, when a linear velocity is made to be fast, time for passing a light spot on a recording mark on a disc is shortened. Accordingly, an amount of energy radiating onto the disc per unit time reduces, and a recording mark is hard to be heated. Therefore, laser power necessary for erase becomes high. Moreover, as the linear velocity becomes faster, a clock frequency becomes higher. Accordingly, information is recorded with write pulses having a narrower width, so that higher write power becomes necessary. A relation between the linear velocity and the radiation power is applied to all optical discs. In the case of a phase-change recording, it is important to change an increase of the erase power and the write power for the linear velocity. The reason is as follows.

In the phase-change recording, a recording layer is heated to its melting point, and thereafter cooled rapidly, whereby an amorphous recording mark is formed. A so-called re-crystallization region is formed in the periphery of the recording mark, the re-crystallization region being formed in such a manner that the recording mark is once heated to its melting point, and thereafter a crystal growth begins from a crystal nucleus around the recording mark during a cooling step to produce a crystal phase. It was made clear as a result of an investigation that a width of this re-crystallization region depends on a linear velocity during recording, and the width thereof becomes narrower as the linear velocity is faster. Accordingly, when recording is performed while varying the linear velocity, dependency of the width of the re-crystallization region on the linear velocity must be considered to obtain a certain recording mark width. This is because the phase-change recording is a recording principle in which a cooling step subsequent to the temperature elevation is more important, unlike a recording principle in which a mark shape is decided depending on temperature distribution like magneto-optical recording.

When the linear velocity becomes faster, a clock frequency becomes higher according to the linear velocity, and a window width Tw becomes shorter. Accompanied with shortening of the window width Tw, light emission time of the pulses becomes shorter, so that influences of a rise-up time of laser become larger. As shown in FIG. 3, when the linear velocity is slow, the clock frequency is low. Accordingly the influence of the rise-up time of the laser is a little, and hence a light emission pulse akin to a rectangular shape can be obtained. However, when the linear velocity is fast, the clock frequency becomes high, and the pulse drops before the laser outputs inherent power, so that sufficient power cannot be sometimes obtained substantially Accordingly, the optimized recording waveform needs to be obtained for each variable linear velocity respectively.

Form above-described viewpoints, when the recording is performed while varying the linear velocity, it is necessary to obtain the optimized recording power and recording waveform for the respective linear velocities by performing the test writing at these linear velocities. However, since in the DVD-RAM disc, the test writing area exists only in the inner and outer peripheries thereof, there has been a problem that the test writing can be performed only at the two kinds of the linear velocities, that is, only at the linear velocity on the inner periphery of the disc and at the linear velocity on the outer periphery thereof.

SUMMARY OF THE INVENTION

An object of the present invention is to provide an optical disc apparatus solving the above-described problems in the prior arts, which uses an optical disc capable of recording information while varying a linear velocity, has test writing regions on the inner and outer peripheries thereof, and adopts a test writing scheme that enables a precise markedge recording.

The present invention achieves the foregoing object by adopting the following information recording method and the following optical disc apparatus.

(1) An information recording method of recording information onto a phase-change disc while varying a linear velocity so as to allow the information to correspond to an edge of a recording mark formed in radiating light pulses from a light source to the phase-change disc, the method comprises: a step for performing test writings for an outer periphery zone of the disc at a plurality of linear velocities, thus obtaining recording parameters suitable for the respective linear velocities; and a step for controlling the light source in accordance with the recording parameter corresponding to a linear velocity for an area on which the information is to be recorded, the recording parameter being obtained based on a correlation between the linear velocities and the recording parameters corresponding to the respective linear velocities.

In the case of the ZCAV scheme, it is advantageous that the plurality of linear velocities at which the test writing is performed are set in accordance with linear velocities for the respective zones.

(2) In the information recording method of item (1), the information recording method is characterized in that when the test writing is performed, a low linear velocity is changed to a high linear velocity, thus obtaining a recording parameter suitable for each of the linear velocities.

(3) In the information recording method of item (1), the information recording method is characterized in that when the test writing is performed, a high linear velocity is changed to a low linear velocity, thus obtaining a recording parameter suitable for each of the linear velocities.

(4) In the information recording method of item (1), the information recording method is characterized in that when the test writing is performed, a dependency of a light pulse shape on the linear velocity is compensated.

(5) An information recording method of recording information onto a phase-change disc while varying a linear velocity so as to allow the information to correspond to an edge of a recording mark formed in radiating light pulses from a light source to the phase-change disc, the method comprises: a step for performing test writing for inner and outer periphery zones of the disc at substantially equal linear velocities to each other, thus obtaining a recording parameter suitable for the inner periphery of the disc and a recording parameter suitable for the outer periphery thereof, a step for obtaining a recording parameter correction coefficient at a position with respect to a disc radius based on the recording parameter suitable for the inner periphery of the disc and the recording parameter suitable for the outer periphery thereof; and a step for correcting a recording parameter corresponding to a linear velocity at an area onto which the information is to be recorded with the recording parameter coefficient, thus controlling the light source in accordance with the corrected recording parameter.

(6) In the information recording method of the item (5), the information recording method is characterized in that the recording parameter corresponding to the linear velocity at the area onto which the information is to be recorded can be obtained based on the recording parameter suitable for each of the respective linear velocities obtained by performing the test writing for the outer periphery of the disc at the different linear velocities.

(7) In the information recording method of one of items (1) to (6), the information recording method is characterized in that the recording parameter includes recording power, erase power and a pulse width.

(8) In an optical disc apparatus which comprises: an optical head having a light source radiating light onto an optical disc and a photodetector for detecting the light reflected from the optical disc; optical head driving means for driving the optical head relative to the optical disc; disc driving means for rotationally driving the optical disc while varying a linear velocity at a position of the optical head; and recording waveform generating means for generating a recording waveform to drive the light source, for recording information so as to allow the information to correspond to an edge of a recording mark, the optical disc apparatus is characterized in that provided is means for performing test writing at a plurality of linear velocities for an outer periphery zone of the optical disc, thus obtaining a recording parameter suitable for each of the linear velocities, and the recording waveform generating means generates a recording waveform based on a recording parameter corresponding to a linear velocity of an area onto which information is to be recorded, the recording parameter being obtained based on a correlation between each of the plurality of linear velocities and the recording parameter suitable for each of the linear velocities.

(9) In an optical disc apparatus which comprises: a optical head having a light source radiating light onto an optical disc and a photodetector for detecting the light reflected from the optical disc; optical head driving means for driving the optical head relative to the optical disc; disc driving means for rotationally driving the optical disc while varying a linear velocity at a position of the optical head; and recording waveform generating means for generating a recording waveform to drive the light source, for recording information so as to allow the information to correspond to an edge of a recording mark, the optical disc apparatus is characterized in that provided is means for performing test writing for inner and outer periphery zones of the optical disc at substantially equal linear velocities, thus obtaining recording parameters suitable for the inner and outer periphery zones of the optical disc, and for obtaining a recording parameter correction coefficient at a position with respect to a disc radius based on the recording parameters respectively suitable for the inner and outer periphery zones, and the recording waveform generating means corrects, by use of the recording parameter correction coefficient, the recording parameter corresponding to a linear velocity of an area onto which information is to be recorded and generates a recording waveform based on the corrected recording parameter.

(10) In the optical disc apparatus of one of the items (8) and (9), the optical disc apparatus is characterized in that the recording parameter includes recording power, erase power and a pulse width.

When the test writing is performed for the linear velocities of all areas of the optical disc by use of only a test writing zone on the inner periphery of the optical disc, the linear velocity on the outer periphery zone of the optical disc is higher than that on the inner periphery zone of the optical disc. Therefore, the rotation number of the optical disc must be increased, therefore, high performance of the motor is required. Furthermore, the high speed rotation of the motor may cause heat generation, and hence such heat generation is not desirable. On the contrary, when the test writing is performed on the outer periphery of the disc, the linear velocity on the outer periphery of the disc is the highest. Accordingly, the rotation number of the disc needs not to be made larger in addition, and an existing motor can be used. Furthermore, since the test writing can be performed at any linear velocity by making the rotation number of the disc smaller, it is possible to investigate a change of laser power resulting from a change of the light pulse shape when the clock frequency and the linear velocity change.

When a property difference such as a recording sensitivity difference occurs between the inner and outer peripheries of the disc, laser power and a recording waveform during recording must be made with taking the property difference into account. In this case, the test writing is performed in the two test writing zones of the inner and outer peripheries of the disc at the same linear velocity, for example, the linear velocity in the inner periphery of the disc. As a result, the recording property difference between the inner and outer peripheries of the disc can be measured, and a recording property on an intermediate zone of the disc can be interpolated.

According to the present invention, it is possible to provide an optical disc apparatus which suppresses an edge shift caused by the shape change of the recording mark accompanied with the linear velocity change and the change of the thermal interference condition in the tracking direction, and shows good jitter.

BRIEF DESCRIPTION OF THE DRAWINGS

FIG. 11 is a drawing showing an example of a recording parameter used in the present invention.

DETAILED DESCRIPTION OF THE PREFERRED EMBODIMENTS

Embodiments of the present invention will be described with reference to the accompanying drawings below. In FIG. 11, examples of recording parameters used in the present invention are shown. In the following embodiment, a method to obtain these recording parameters is explained. The recording parameters shown in FIG. 11 are write power Pw, erase power Pe, pulse widths (a pulse width FP of a first pulse, a pulse width MP of a multi pulse and a pulse width LP of a last pulse) and power levels (a power level $P_{FP}$ of the first pulse, a power level $P_{MP}$ of the multi pulse and a power level $P_{LP}$ of the last pulse). Herein, when the power levels $P_{FP}$, $P_{MP}$ and $P_{LP}$ are equal to each other, that is, when $P_{FP}=P_{MP}=P_{LP}$, these power levels are collectively referred to as a recording power Pw, that is, $Pw=P_{FP}=P_{MP}=P_{LP}$. A case where $Pw=P_{FP}=P_{MP}=P_{LP}$ is not satisfied is shown in Embodiment 2.

Embodiment 1

An optical disc having a diameter of 8 cm was prepared. This optical disc has good jitter at a linear velocity of 8.2 m/s all over the recordable area thereof In this embodiment, recording/reproducing of the optical disc was performed by use of an optical disc apparatus shown in FIG. 1. As a method of controlling a motor dining the recording/reproducing, a ZCAV scheme was adopted, in which a linear velocity of the disc, a clock frequency T and a window width Tw defined by an inverse number of the clock frequency T are changed for each zone where the recording/reproducing is performed.

Figure 1:
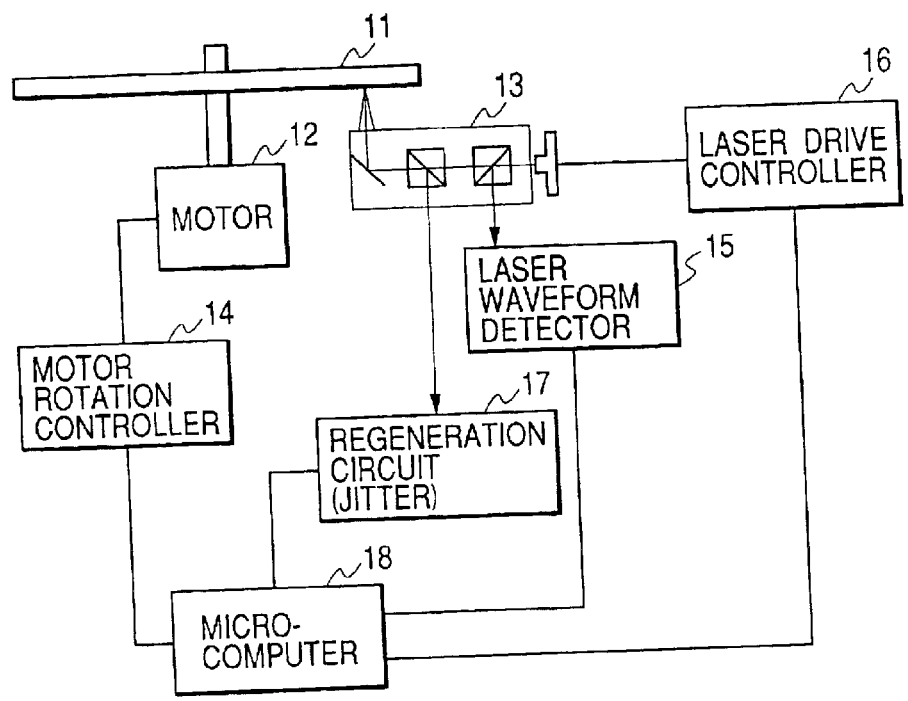
FIG. 1 is a schematic view showing an outline of an optical disc apparatus of the present invention.
Figure 2:
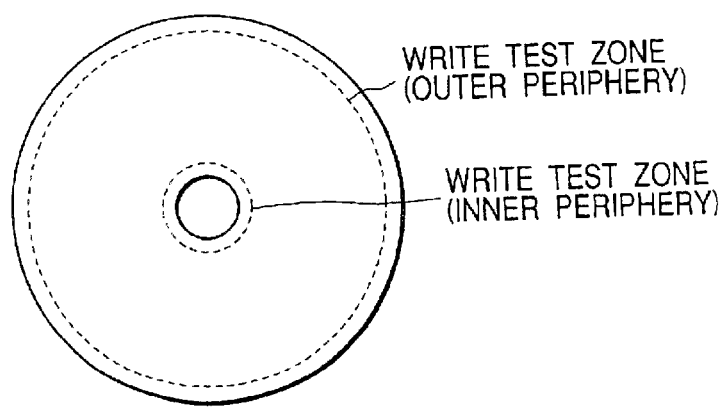
FIG. 2 is a schematic view showing a writing test zone of a 4.7 GB DVD-RAM medium.
Figure 3:
FIG. 3 is an explanatory view for explaining a change of laser output accompanied with a change of a clock frequency.
Figure 3:
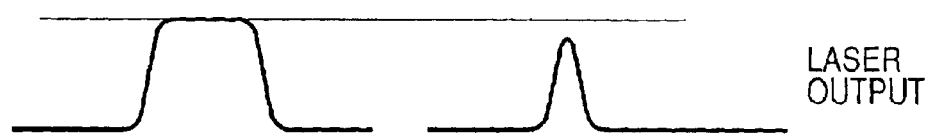

FIG. 1 is a schematic view showing an outline of an optical disc apparatus of the present invention. For simplifying the description, FIG. 1 shows only the minimum constitution of the device necessary for descriptions of the present invention. This optical disc apparatus comprises a motor rotation controller 14 for allowing a motor 12 to rotate, an optical head 13 for radiating a laser beam from a semiconductor laser onto a recording plane of an optical disc 11, and a reproduction process unit 17 for reproducing a signal. The optical disc apparatus further comprises a microcomputer 18 for executing processing to obtain the optimized recording power and a recording pulse width in addition to controlling the entire device, a laser drive controller (hereinafter referred to as a LD controller) 16 for controlling radiation of the semiconductor laser of the optical head 13 in accordance with an instruction of the microcomputer 18, and a laser waveform detector 15 for detecting how the write strategy instructed by the microcomputer 18 actually emits light. The microcomputer 18 also serves as write strategy generating means for generating a signal waveform to drive a light source.

The optical head 13 comprises a semiconductor laser for generating the laser beam having a wavelength of 659 nm as an energy beam for information recording. The laser beam was focused onto a recording layer of the optical disc 11 by use of an objective lens having a NA 0.6 for recording information. The optical head 13 is driven by optical head driving means (not shown) controlled by the microcomputer 18, and can move in a radius direction of the optical disc 11. Furthermore, the optical head 13 comprises a photodetector, and an output of the photodetector which detects the reflected light from the optical disc 11 is input to the regeneration circuit 17. An output of the photodetector which detects part of the radiation light from the semiconductor laser is input to the laser waveform detector 15.

When the window width Tw changed in response to the linear velocity, it was checked whether a desired laser waveform was output. As a result of the check, it was confirmed that the optical disc apparatus of this embodiment could obtain a desired laser beam emission waveform until the linear velocity of 16.4 m/s Accordingly, in the case of this embodiment using the optical disc having the diameter of 8 cm, it was unnecessary to consider the dependency of the laser beam emission waveform on the linear velocity. As described above, it is important to confirm whether the desired laser beam emission waveform is obtained by checking the laser beam emission waveform prior to the test writing or simultaneously with the test writing. When the desired laser beam emission waveform is not obtained, correction is necessary as described in Embodiment 2.

Figure 4:
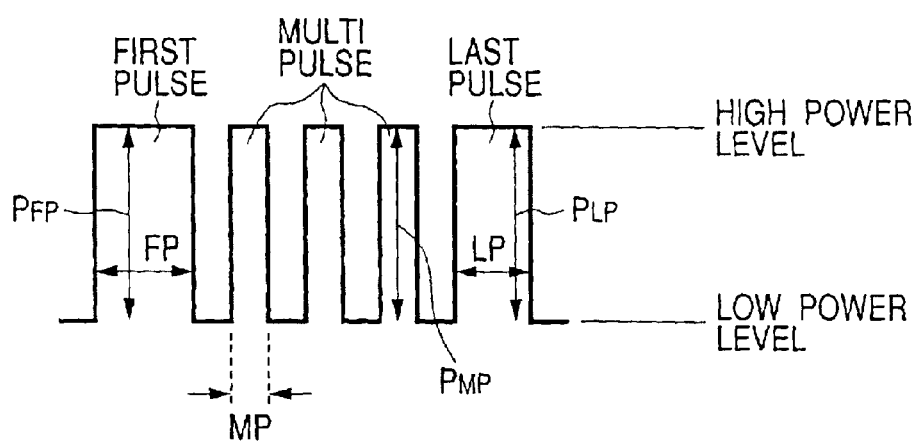
FIG. 4 is a schematic view showing a recording waveform used for a recording/reproducing property evaluation of an optical disc.

In this embodiment, as shown in FIG. 4, a write strategy having two levels of low (erase) power and high (write) power was used. The low power level can erase a recording mark (crystallization), and the high power level can form the recording mark (amorphousness). The write strategy for forming one mark is composed of a first pulse, a multi pulse and a last pulse. In this case, the shortest mark is the one in which the first and last pulses are united with each other. In the microcomputer 18, provided is a waveform table in accordance with an adaptive type recording waveform control scheme in which the widths of the first and last pulses are varied in accordance with lengths of space portions positioned front/rear the mark portion, and the write strategy capable of excluding influences of inter-mark thermal interference caused between the marks can be generated by the waveform table.

Furthermore, this recording device corresponds to a scheme (so-called land groove (L/G) recording scheme) which records information onto both of the groove and the land (area between the grooves), and tracking for the groove and the land can be arbitrarily selected.

The test writing was performed to obtain the optimized recording power, the optimized erase power and the write strategy, which are suitable for the linear velocities, before the recording/reproducing of the information was actually performed based on a series of the above-described operations. An example of an order of the test writing will be described below.

Figure 5:
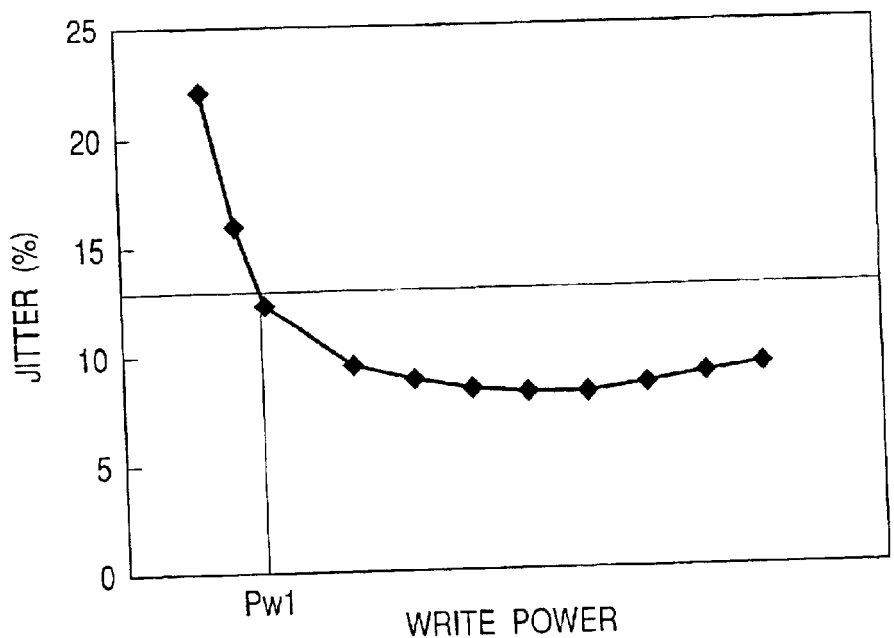
FIG. 5 is a drawing showing a relation between recording power and jitter.

First, the optimized recording power Pw, the optimized erase power Pe, the first pulse width FP and the last pulse width LP suitable at the linear velocity of 8.2 m/s were obtained by use of the test writing area on the inner periphery of the disc. To be concrete, at first, the recording power is changed in a state where the erase power and the pulse width are fixed as shown in FIG. 5, and the recording is performed. The recording power showing the minimum jitter is set to the optimized recording power. In this device, since an error occurs when the jitter is larger than 13%, power (Pw1×1.2 to 1.3) may be set to the optimized recording power, which is obtained in such a manner that the recording power Pw1 in which the jitter is 13% is set to a threshold value, a margin is estimated for the recording power in consideration for an amount of a sensitivity difference over the disc plane, influences of dusts adhered to the disc surface and a possibility of defocusing of a laser spot, and 20 to 30% of the threshold value as the margin amount is added to the threshold.

Figure 6:
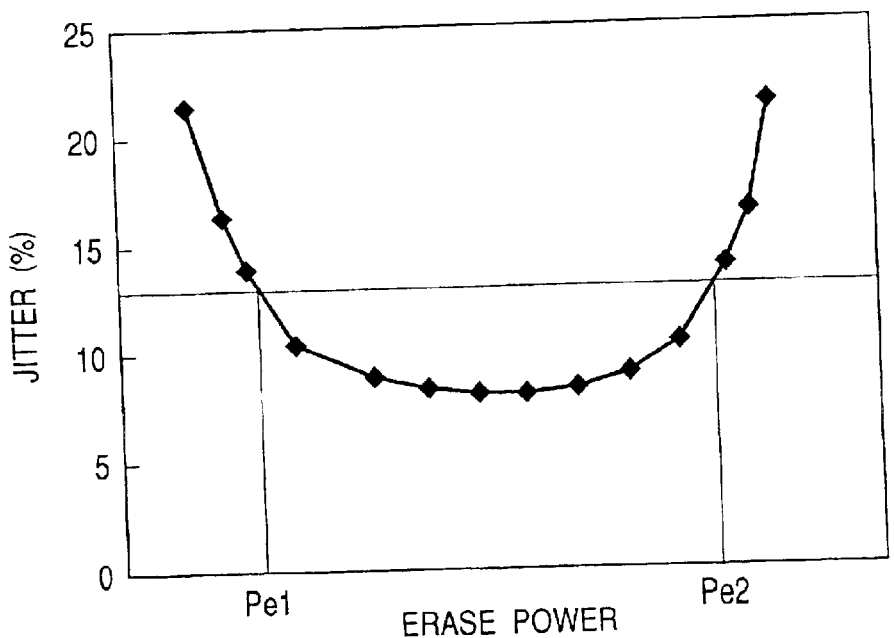
FIG. 6 is a drawing showing a relation between erase power and jitter.

Secondly, by use of the optimized recording power obtained in the above, the erase power was changed in a state where the pulse width was fixed, and the recording was performed. Herein, as shown in FIG. 6, intermediate power of the erase power shown by Pe1 and Pe2 in FIG. 6, in which the jitter is 13%, was set to the optimized erase power. The erase power in which the minimum jitter is obtained may be set to the optimized erase power. Moreover, a value, which is obtained by adding a margin amount (25 to 50%) such as the difference of the sensitivity in the disc plane and the dusts on the disc surface described above to the erase power Pe1 on the low power side in which the jitter is 13%, may be set to the optimized erase power.

Figure 7:
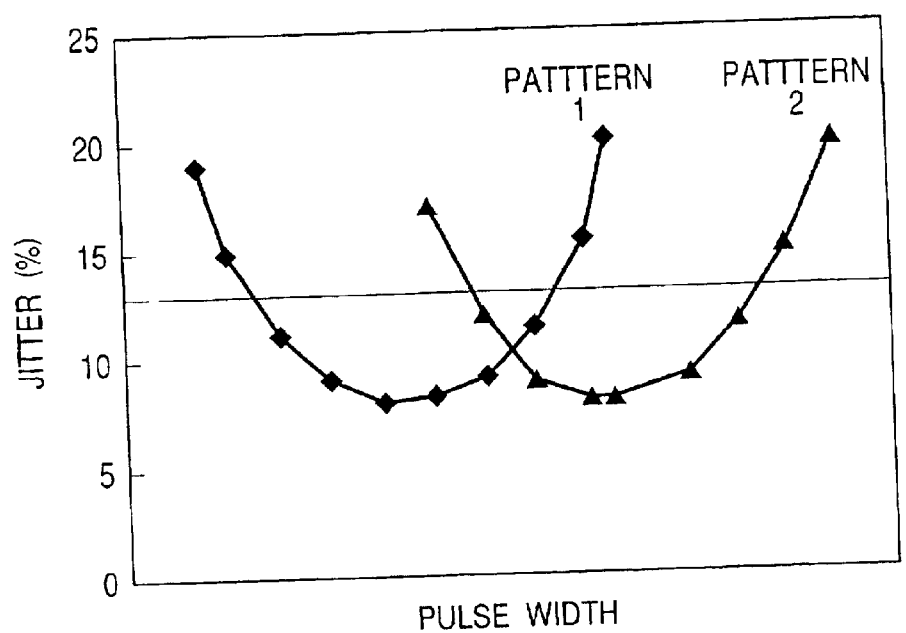
FIG. 7 is a drawing showing a relation between a pulse width and jitter.

Thirdly, the optimized pulse width was determined by use of the obtained optimized recording power and erase power. The optimized pulse width changes its optimized values of the first pulse width and the last pulse width depending on the lengths of the space portions located in the front/rear of the recording mark portion. As shown in FIG. 7, the ordinate indicates the pulse width, and the abscissa indicates the jitter. A pulse width at which the jitter is a minimum for each pattern of the recording mark and the space is set to the optimized pulse width for each recording pattern. This operation is performed for the first pulse width and the last pulse width. The optimized pulse width may be set to an intermediate pulse width between the two pulse widths, at which the jitter becomes equal to 13%.

After the first to third operations, the test writing operation performed to determine the optimized condition at the inner periphery (linear velocity of 8.2 m/s) was completed. This optimized condition corresponds to the condition A of FIG. 11. Next, the optical head is moved to the outer periphery of the disc, and the rotation number of the disc was reduced. The same operations as those described above were performed, and thus the optimized write strategy and the optimized power at the linear velocity of 8.2 m/s which is the same as that of the inner periphery were obtained. This corresponds to the condition B of FIG. 11. In the disc used in this embodiment, no recording sensitivity difference between the inner and outer peripheries thereof did not exist, and there was no difference of the optimized write strategy and the optimized power between the inner and outer peripheries of the disc. In FIG. 11, Pw (A)=Pw (B), Pe (A)=Pe (B), FP (A)=FP (B), MP (A)=MP (B) and LP (A)=LP (B) were satisfied. As described above, by performing the test writing at the same linear velocities for the inner and outer peripheries of the disc, data for correcting the recording sensitivity difference between the inner and outer peripheries of the disc can be obtained. To be concrete, the recording parameter correction coefficient that is a function of the disc radius position is determined, and the recording parameter corresponding to the disc radius position (linear velocity) to be recorded is corrected, whereby the optimized recording parameter taking the recording sensitivity difference between the inner and outer peripheries of the disc into account is obtained.

For example, when the test writing at the same linear velocities between the inner and outer peripheries of the disc was performed, the recording power at the radius position (linear velocity) between the inner and outer peripheries can be obtained with good performance in the case of Pw (A)≠Pw (B), by use of a value obtained by performing straight line interpolation for the recording power Pw (A) and the recording power Pw (B). Similarly, as for the erase power and the recording pulse width, a value obtained by performing straight line interpolation for the optimized values on the inner and outer peripheries should be used.

Similarly, the rotation number of the disc was increased and the test writing was serially performed at the linear velocity of 12 m/s and the linear velocity of 14 m/s by use of the test writing area on the outer periphery thereof, thus obtaining the optimized powers and the optimized pulse widths at the respective linear velocities. The optimized erase power was 4 mW at the linear velocity of 8.2 m/s, which corresponds to Pe (B) of FIG. 11, 4.5 mW at the linear velocity of 12 m/s, which corresponds to Pe (C) of FIG. 11, and 4.8 mW at the linear velocity of 14 m/s. The optimized recording power was 10 mW at the linear velocity of 8.2 m/s, which corresponds to Pw (B) of FIG. 11, 10.5 mW at the linear velocity of 12 m/s, which corresponds to Pw (C) of FIG. 11, and 10.7 mW at the linear velocity of 14 m/s.

A write strategy and power at a linear velocity in which the test writing is not actually performed can be defined by use of an equation (P=αV+α' and the like) based on the optimized power and the optimized pulse width at each linear velocity at which the test writing was performed. In the case where there is no test writing area on a middle area of the disc, the test writing is performed on the outer periphery of the disc while changing the linear velocity, like this embodiment, whereby it is possible to obtain the optimized power and the optimized write strategy all over the radius area of the disc.

When an EFM signal was recorded at a radius of 23 mm (linear velocity: 8.2 m/s), 33.7 mm (linear velocity: 12 m/s) and 39.3 mm (linear velocity: 14 m/s) with the optimized recording power and the optimized write strategy obtained in the above-described test writing, in all radius positions of the disc, jitter was as little as 8.2 to 8.5% in the land, and 7.9 to 8.3% in the groove. Here, jitter means a squared average value of jitter values in the leading and trailing edges. The window width (Tw) in the jitter measurement is an inverse number of the clock frequency, the shortest recording signal is 3 Tw, and the longest recording signal is 14 Tw. These are randomly recorded. A regeneration equalizer is used for these measurements.

The order of the test writing in this embodiment (an order in which the linear velocity is changed, or an order in which the recording power, the erase power and the pulse width are obtained) is merely an example. Even if the order of these is changed, the same effects of the present invention can be obtained. Furthermore, in this embodiment, though the write strategy has a binary level: one is the recording power and the other is the erase power, the present invention can show the same effects even when a write strategy having three or more levels by adding different power levels is used.

Furthermore, in this embodiment, the good jitter can be obtained all over the circumferences of the disc. If a disc cannot achieve good jitter at a linear velocity having a certain value or more, the ZCLV scheme may be adopted, in which an upper limit linear velocity is used for circumferences ranging from a certain position on the radius toward the outer periphery area of the disc, at which the upper limit linear velocity is used. At this time, the clock frequency and the window width should be invariable from that certain position toward the outer periphery area of the disc in accordance with the linear velocity. Moreover, in the case of the ZCAV scheme in which the disc is divided into a plurality of areas in the radius direction, a linear velocity in each area is made to be invariable, and the linear velocity is intermittently shifted by each area, the test writing is sufficiently performed with linear velocities for use.

The recording parameter such as the optimized power obtained as the result of these test writing and an individual recognition number of the device are stored in the optical disc of the device, and the results of the test writing and a disc ID are recorded onto the device and stored therein, whereby a time taken for the test writing can be significantly shortened when the same optical disc is again loaded onto the device.

Embodiment 2

An optical disc having a diameter of 12 cm was prepared. To perform the CAV or ZCAV recording in the optical disc having the diameter of 12 cm, the linear velocity is 21 m/s on the outer periphery of the disc when the linear velocity is 8.2 m/s on the inner periphery thereof. Also the clock frequency and the window width change accompanied with the change of the linear velocity. For example, when the window width Tw is 17.1 ns at the linear velocity of 8.2 m/s, the window width Tw is 8.6 ns at the linear velocity of 16.4 m/s, and 6.7 ns at the linear velocity of 21 m/s. As described above, as the linear velocity becomes higher, the window width becomes shorter. Accompanied with this, light emission time becomes shorter, so that influences of rise-up time of a laser become significant.

Figure 8:
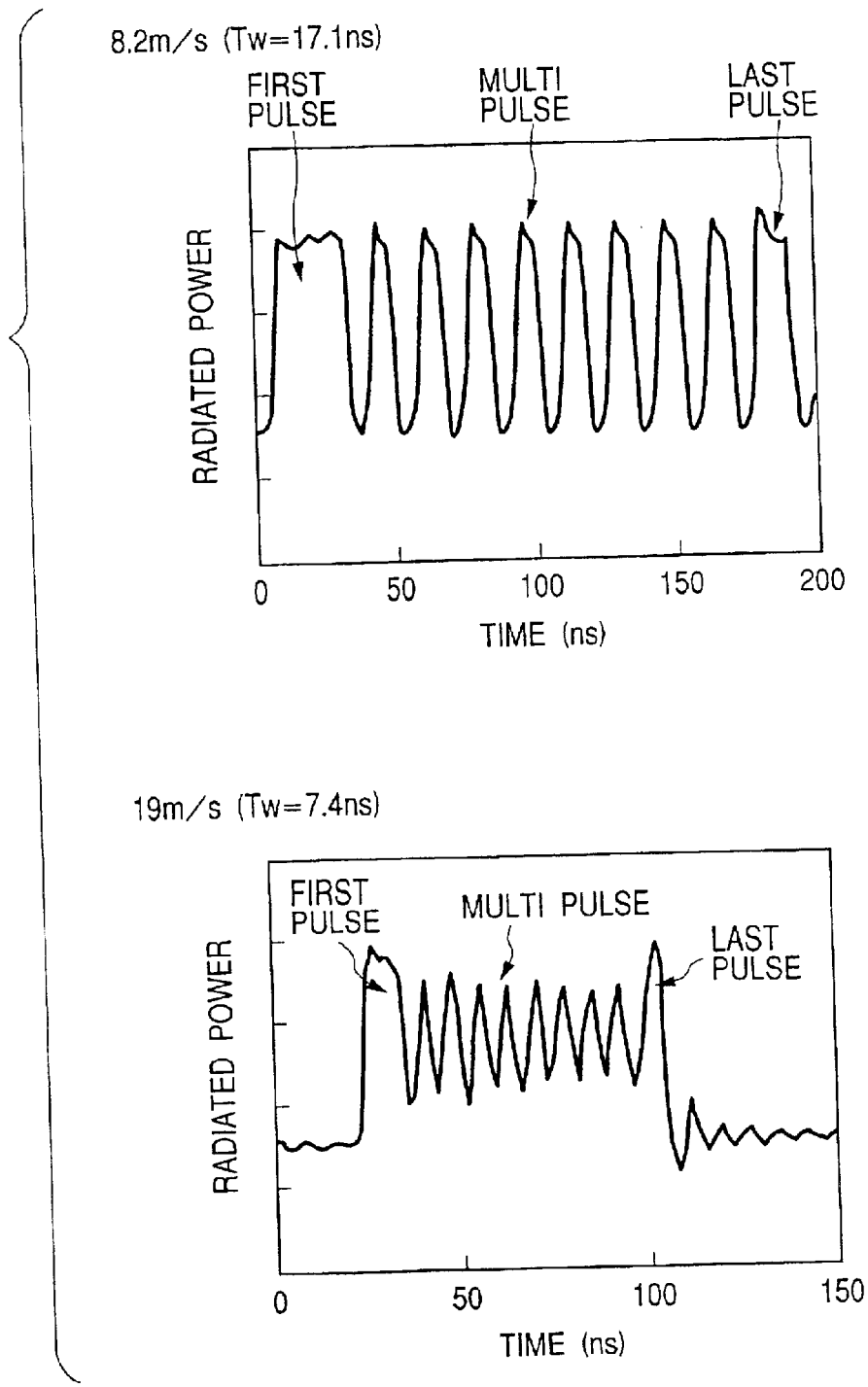
FIG. 8 is a drawing showing a difference of a light emission pulse waveform due to a difference of a linear velocity (window width).

FIG. 8 shows a light emission pulse detected by the laser waveform detector 15 of FIG. 1, when the linear velocity (window width) is changed. In the device used in this embodiment, when the linear velocity becomes higher than 16.4 m/s, which corresponds to the condition D of FIG. 11, the light emission pulse of the multi pulse portion of the write strategy does not reach a power level set. The reason of this is as follows. Since the light emission time of the multi pulse portion is shorter than that of the first pulse and the last pulse, the multi pulse portion is influenced by the rise-up time of the laser because the linear velocity becomes higher. To avoid the influence of such dependency of the light emission power on the linear velocity, in this device, the light emission pulse detected by the laser waveform detector 15 of FIG. 1 is sent to the microcomputer 18, and a relation between an instruction power level and an actual power level is obtained. Thereafter, desired laser power can be obtained by correcting the instruction power.

Figure 9:
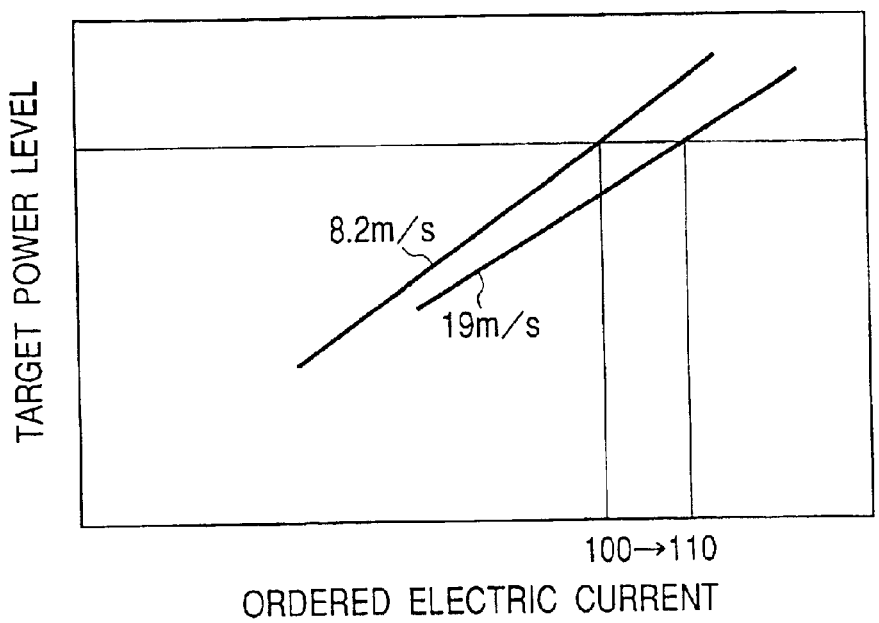
FIG. 9 is a drawing showing an example of a relation between an instruction current value and target light emission power at the different linear velocities (window widths).
Figure 10:
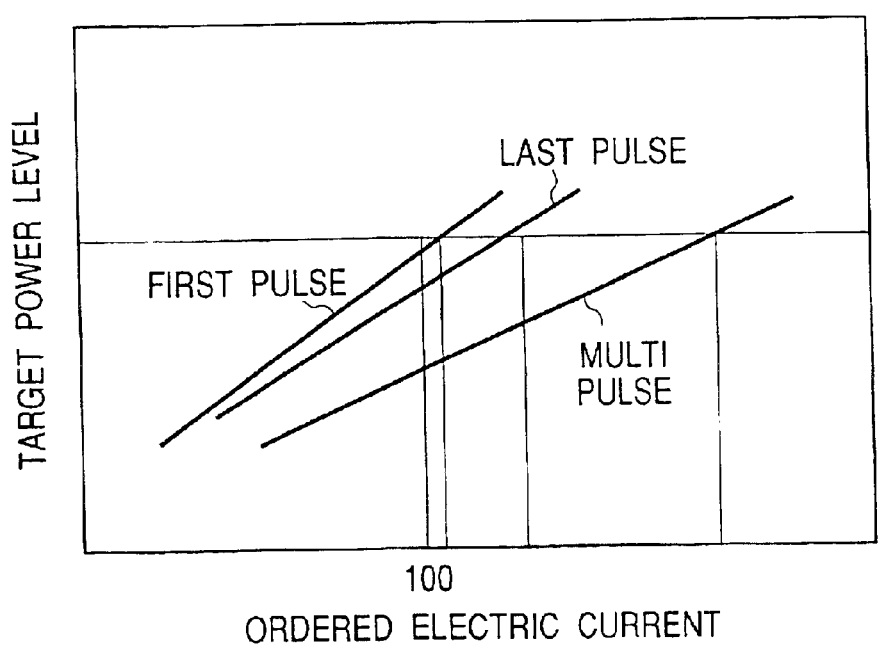
FIG. 10 is a drawing showing an example of a relation between the instruction current value and the target light emission power in a first pulse, a multi pulse and a last pulse.

In FIG. 9, a relation between an instruction current value of the multi pulse width and target light emission power is shown. The instruction current value 100 means a current value capable of obtaining a target light emission power when the laser is allowed to emit light in a state where the multi pulse width is not influenced by the rise-up/drop time of the laser. As shown in FIG. 9, it is possible to obtain the desired laser power at the instruction current value of 100 at the linear velocity of 8.2 m/s. However, the laser power of the multi pulse can be obtained only by about 90% of the targeted power, when the instruction current value is 100 at the linear velocity of 19 m/s. By detecting the laser power of the multi pulse and by setting the instruction current level to 110%, a desired power can be obtained. When the linear velocity is further higher, the first pulse and the last pulse as well as the multi pulse must be corrected, as shown in FIG. 10.

As described above, an actual laser power is measured and feedback is applied by detecting the light emission pulse at each linear velocity, whereby influences of the rise-up/drop time of the laser due to the linear velocity change can be made as little as possible. In such a manner described above, after the dependency of the light pulse power on the linear velocity is removed, the linear velocity is changed step-by-step on the outer periphery area of the optical disc as described in Embodiment 1, and the test writing is performed. Thus, the optimized recording power, the optimized erase power and the pulse width for each linear velocity are obtained. By using the data obtained in the above-described manner, the optimized power and the optimized write strategy in all of the radius areas of the disc can be obtained.

In this embodiment, though the desired light emission pulse power is obtained by correcting the laser power level, it is possible to make the influences of the rise-up/drop time of the laser small by controlling the width (light emission time) of the multi pulse in the scope of the present invention.

From the above descriptions, in the test writing while changing the linear velocity, it is found that the determination of the recording parameter shown in FIG. 11 is important.

What is claimed is:

1. An information recording method of recording information onto a phase-change disc while varying a linear velocity so as to allow the information to correspond to an edge of a recording mark formed in radiating light pulses from a tight source to the phase-change disc, the method comprising the steps of:

performing test writing for inner and outer periphery zones of the disc at substantially equal linear velocities to each other, thus obtaining a recording parameter suitable for the inner periphery of the disc and a recording parameter suitable for the outer periphery thereof;

obtaining a recording parameter correction coefficient at a position with respect to a disc radius based on the recording parameter suitable for the inner periphery of the disc and the recording parameter suitable for the outer periphery thereof; and correcting a recording parameter corresponding to a linear velocity at an area onto which the information is to be recorded, thus controlling said light source in accordance with said corrected recording parameter.

2. The information recording method according to claim 1, wherein the recording parameter corresponding to said linear velocity at the area onto which the information is to be recorded is obtained based on the recording parameter suitable for each of the respective linear velocities obtained by performing the test writing for the outer periphery of said disc at the different linear velocities.

3. The information recording method according to claim 1, wherein said recording parameter includes recording power, erase power and a pulse width.

4. An optical disc apparatus which includes a optical head having a light source radiating light onto an optical disc and a photodetector for detecting the light reflected from said optical disc, optical head driving means for driving said optical head relative to said optical disc, disc driving means for rotationally driving said optical disc while varying a linear velocity at a position of the optical head, and recording waveform generating means for generating a recording waveform to drive the light source, and which records information so as to allow the information to correspond to an edge of a recording mark, the optical disc apparatus further comprising:

means for performing test writing for inner and outer periphery zones of said optical disc at substantially equal linear velocities, thus obtaining recording parameters suitable for the inner and outer periphery zones of said optical disc, and for obtaining a recording parameter correction coefficient at a position with respect to a disc radius based on the recording parameters respectively suitable for the inner and outer periphery zones, wherein the recording waveform generating means corrects, by use of the recording parameter correction coefficient, a recording parameter corresponding to a linear velocity of an area onto which information is to be recorded and generates a recording waveform based on the corrected recording parameter.

5. The optical disc apparatus according to claim 4, wherein said recording parameter includes recording power, erase power and a pulse width.

* * * * *